United States Patent
Abe et al.

(10) Patent No.: US 10,268,147 B2
(45) Date of Patent: Apr. 23, 2019

(54) ADDITION-CURABLE LIQUID SILICONE RUBBER MIXTURE, ELECTROPHOTOGRAPHIC MEMBER AND PRODUCTION METHOD THEREFOR, AND FIXING APPARATUS

(71) Applicant: CANON KABUSHIKI KAISHA, Tokyo (JP)

(72) Inventors: Katsuya Abe, Tokyo (JP); Katsuhisa Matsunaka, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/877,763

(22) Filed: Jan. 23, 2018

(65) Prior Publication Data

US 2018/0217537 A1    Aug. 2, 2018

(30) Foreign Application Priority Data

Jan. 30, 2017    (JP) .................................. 2017-014476

(51) Int. Cl.
| | |
|---|---|
| C08L 83/07 | (2006.01) |
| G03G 15/20 | (2006.01) |
| C08G 77/12 | (2006.01) |
| C08G 77/20 | (2006.01) |
| C08L 83/04 | (2006.01) |

(Continued)

(52) U.S. Cl.
CPC ......... *G03G 15/2057* (2013.01); *C08G 77/12* (2013.01); *C08G 77/20* (2013.01); *C08L 83/04* (2013.01); *C08L 2203/20* (2013.01); *C08L 2205/025* (2013.01)

(58) Field of Classification Search
CPC ....................... C08L 2205/025; C08L 2203/20
See application file for complete search history.

(56) References Cited

U.S. PATENT DOCUMENTS

| | | |
|---|---|---|
| 9,063,491 B2 | 6/2015 | Matsunaka et al. |
| 9,134,663 B2 | 9/2015 | Matsunaka et al. |

(Continued)

FOREIGN PATENT DOCUMENTS

| | | |
|---|---|---|
| JP | 8-113713 A | 5/1996 |
| JP | 2001-62380 A | 3/2001 |

(Continued)

OTHER PUBLICATIONS

Sakakibara et al., U.S. Appl. No. 15/958,121, filed Apr. 20, 2018.
Abe et al., U.S. Appl. No. 15/877,777, filed Jan. 23, 2018.

*Primary Examiner* — David M. Gray
*Assistant Examiner* — Michael A Harrison
(74) *Attorney, Agent, or Firm* — Venable LLP

(57) ABSTRACT

The present disclosure provides an electrophotographic member having an elastic layer containing graphite particles dispersed in a silicone rubber and having a high thermal conductivity in the thickness direction. The electrophotographic member includes a substrate and an elastic layer on the substrate, the elastic layer containing a cured product of an addition-curable liquid silicone rubber mixture including an addition-curable liquid silicone rubber and graphite particles, and the graphite particles having a DBP oil absorption number of 40 cm$^3$/100 g or more and lower than 80 cm$^3$/100 g.

9 Claims, 3 Drawing Sheets

(51) Int. Cl.
   *C08K 3/04*   (2006.01)
   *C08K 5/56*   (2006.01)
   *C08L 83/00*  (2006.01)
   *C09D 183/04* (2006.01)

(56) References Cited

U.S. PATENT DOCUMENTS

| | | |
|---|---|---|
| 9,268,273 B2 | 2/2016 | Miyahara et al. |
| 9,367,009 B2 | 6/2016 | Akiyama et al. |
| 2013/0266339 A1 | 10/2013 | Sugiyama et al. |
| 2015/0185657 A1* | 7/2015 | Matsui ................ G03G 9/0833 430/105 |
| 2017/0205736 A1* | 7/2017 | Tedori .................... B29C 44/00 |
| 2017/0329261 A1* | 11/2017 | Salalha ................ G03G 15/162 |

FOREIGN PATENT DOCUMENTS

| | | |
|---|---|---|
| JP | 2002-213432 A | 7/2002 |
| JP | 2007-186544 A | 7/2007 |
| JP | 2008-95543 A | 4/2008 |
| JP | 2011-128489 A | 6/2011 |
| JP | 2013-122517 A | 6/2013 |
| JP | 5471350 B2 | 4/2014 |
| JP | 2014-228598 A | 12/2014 |

\* cited by examiner

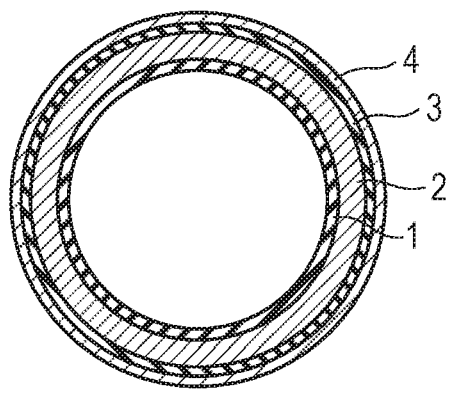
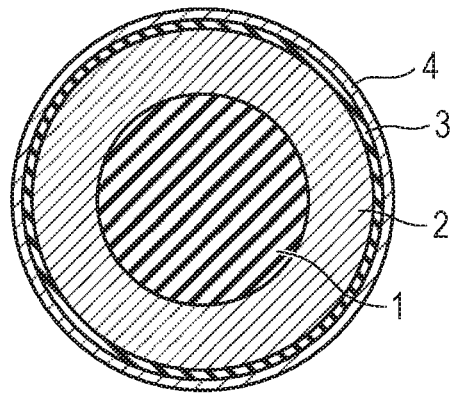
FIG. 1A  FIG. 1B
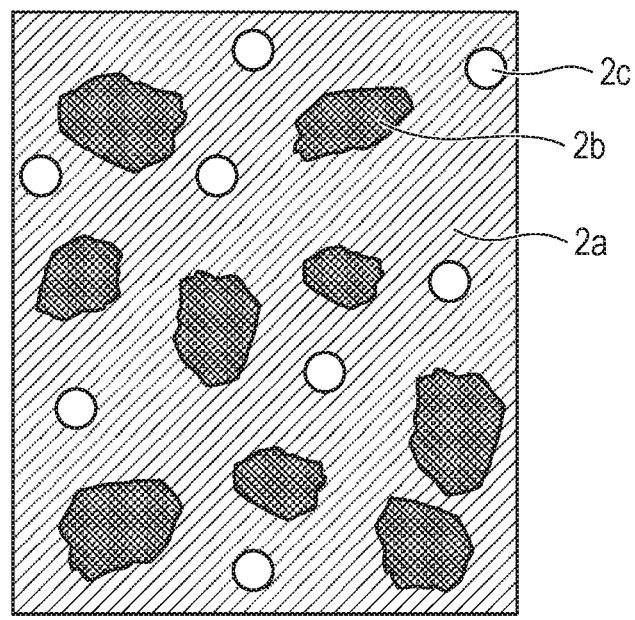
FIG. 2

ADDITION-CURABLE LIQUID SILICONE RUBBER MIXTURE, ELECTROPHOTOGRAPHIC MEMBER AND PRODUCTION METHOD THEREFOR, AND FIXING APPARATUS

BACKGROUND OF THE DISCLOSURE

Field of the Disclosure

The present disclosure relates to an electrophotographic member used for a fixing apparatus for electrophotographic apparatuses such as copying machines and printers, and a production method therefor, and a fixing apparatus. Furthermore, the present disclosure relates to an addition-curable liquid silicone rubber mixture used for the above-mentioned electrophotographic member.

Description of the Related Art

In an electrophotographic apparatus, a fixing apparatus including a heating member and a pressurizing member disposed opposing to the heating member (a heat fixing apparatus) is used so that an unfixed toner image formed on a recording medium is fixed on the recording medium.

Generally, in a fixing apparatus used for an electrophotographic system, paired rotors as electrophotographic members such as a roller and a roller, a film and a roller, a belt and a belt, and a belt and a roller are disposed so as to be able to pressurize a recording medium. Furthermore, a recording medium on which an image by an unfixed toner is introduced into a pressurizing site formed among these rotors and heated, whereby the toner is melted and said image is fixed on the recording medium.

Here, a member that is brought into contact with an unfixed toner image retained on a recording medium and heats the unfixed toner is referred to as a heating member, and a member that is disposed opposing to the heating member to form a fixing nip together with the heating member is referred to as a pressurizing member. The heating member includes a fixing roller, a fixing film and a fixing belt depending on the shape thereof. There is also an electrophotographic member used as a heating member having an elastic layer containing a silicone rubber (see Japanese Patent No. 5471350). In such electrophotographic member, it is preferable to increase the thermal conductivity of the elastic layer.

The present inventors considered various heat conductive fillers so as to enhance the thermal conductivity of an elastic layer containing a cured product of an addition-curable liquid silicone rubber mixture.

Consequently, they have found that graphite particles can improve the thermal conductivity of the elastic layer more efficiently as compared to heat conductive fillers such as carbon black. That is, graphite particles can impart higher thermal conductivity to an elastic layer as compared to carbon black even at a relatively low content. However, there were some cases where an addition-curable liquid silicone rubber mixture containing graphite particles in an addition-curable liquid silicone rubber was difficult to be sufficiently cured. The present inventors recognized that, in a case where graphite particles are used for improving the heat conductivity of an elastic layer containing a cured product of an addition-curable liquid silicone rubber, it is necessary to develop a technology to stably curing the addition-curable liquid silicone rubber.

SUMMARY OF THE DISCLOSURE

An embodiment of the present disclosure is directed to providing an electrophotographic member including an elastic layer containing graphite (graphite particles) dispersed in a silicone rubber and having a high thermal conductivity in the thickness direction.

Furthermore, another embodiment of the present disclosure is directed to providing an addition-curable liquid silicone rubber mixture having sufficient curability.

Still another embodiment of the present disclosure is directed to providing a fixing apparatus that contributes to the formation of a high-quality electrophotographic image.

According to an embodiment of the present disclosure, there is provided an electrophotographic member including: a substrate; and an elastic layer on the substrate, the elastic layer containing a cured product of an addition-curable liquid silicone rubber mixture including an addition-curable liquid silicone rubber and graphite particles, and the graphite particles having a DBP oil absorption number of 40 $cm^3$/100 g or more and lower than 80 $cm^3$/100 g.

Furthermore, according to another embodiment of the present disclosure, there is provided an addition-curable liquid silicone rubber mixture containing graphite particles, wherein the graphite particles have a DBP oil absorption number of 40 $cm^3$/100 g or more and lower than 80 $cm^3$/100 g.

Furthermore, according to still another embodiment of the present disclosure, there is provided a method for producing an electrophotographic member including: applying an addition-curable liquid silicone rubber mixture on an outer peripheral surface of a substrate; and forming an elastic layer by curing the addition-curable liquid silicone rubber mixture.

According to a still another embodiment of the present disclosure, there is provided a fixing apparatus including a heating member and a pressurizing member disposed opposing to the heating member, wherein the heating member is the above-mentioned electrophotographic member.

Further features of the present disclosure will become apparent from the following description of exemplary embodiments with reference to the attached drawings.

BRIEF DESCRIPTION OF THE DRAWINGS

FIG. 1A is an outline cross-sectional schematic view of an electrophotographic member having an endless belt shape of an embodiment of the present disclosure, and FIG. 1B is an outline cross-sectional schematic view of an electrophotographic member having a roller shape of an embodiment of the present disclosure.

FIG. 2 is a schematic view of an addition-curable liquid silicone rubber mixture of an embodiment of the present disclosure.

DESCRIPTION OF THE EMBODIMENTS

Figure 3:
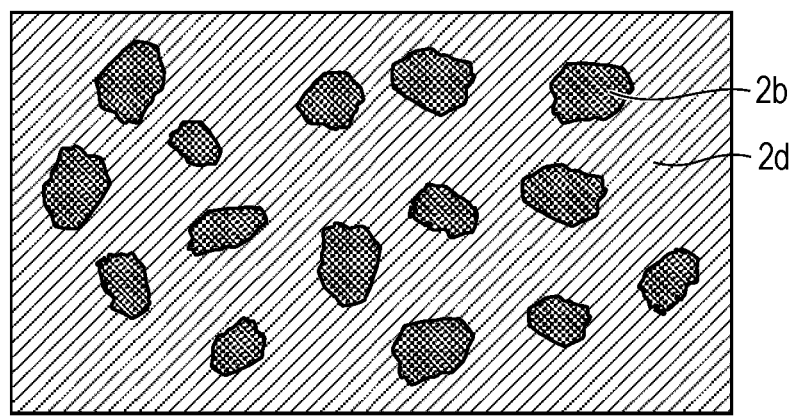
FIG. 3 is a cross-sectional view of an elastic layer of an electrophotographic member of an embodiment of the present disclosure.

Preferred embodiments of the present disclosure will now be described in detail in accordance with the accompanying drawings.

The present inventors considered the reason why there are some cases where an addition-curable liquid silicone rubber mixture containing graphite particles is not sufficiently cured. During the process of the consideration, the present inventors found that the dibutyl phthalate (DBP) oil absorption number of the used graphite particles and the curing state of the addition-curable liquid silicone rubber mixture have a correlation. Specifically, the present inventors confirmed that the curing of the addition-curable liquid silicone rubber mixture is inhibited more significantly at a larger DBP oil absorption number. From such experimental results, the present inventors considered that the inhibition of the curing of the addition-curable liquid silicone rubber mixture occurs for the following reason.

That is, the present inventors considered that curing is inhibited since the organopolysiloxane having active hydrogen bound to a silicon atom, which functions as a crosslinking agent, is absorbed in the fine pores of the graphite particles, and thus the hydrosilylation reaction does not sufficiently progress.

Therefore, the present inventors considered that said crosslinking agent becomes difficult to be absorbed by the fine pores of the graphite particles by decreasing the DBP oil absorption number of the graphite particles, and made a further consideration. Consequently, the present inventors found that even an addition-curable liquid silicone rubber mixture containing graphite particles can be sufficiently cured by using graphite particles having a DBP oil absorption number of 40 $cm^3/100$ g or more and lower than 80 $cm^3/100$ g, and completed the present disclosure.

Japanese Patent Application Laid-Open No. H08-113713 discloses a disclosure relating to an electroconductive silicone rubber composition containing a carbon-based electroconductivity imparting agent such as carbon black or graphite. Furthermore, Japanese Patent Application Laid-Open No. H08-113713 discloses that an electroconductive silicone rubber composition containing a large amount of carbon-based electroconductivity imparting agent in a silicone rubber has decreased curability. However, the carbon-based electroconductivity imparting agent that is specifically used in Examples and Comparative Examples of Japanese Patent Application Laid-Open No. H08-113713 is only carbon black, and Japanese Patent Application Laid-Open No. H08-113713 does not specifically disclose or suggest graphite at all.

The present disclosure will be explained below in detail.

(1) Constitution of Electrophotographic Member

The electrophotographic member according to an embodiment of the present disclosure will be explained by using drawings.

FIG. 1A and FIG. 1B are cross-sectional drawings of the electrophotographic member of an embodiment of the present embodiment. FIG. 1A represents an example of an electrophotographic member having an endless belt shape (hereinafter also referred to as "electrophotographic belt"). FIG. 1B represents an example of an electrophotographic member having a roller shape (hereinafter also referred to as "electrophotographic roller").

The electrophotographic belt shown in FIG. 1A has a substrate (base material) 1 having an endless belt shape, and an elastic layer 2 that covers the outer peripheral surface of the substrate 1. Furthermore, the electrophotographic roller shown in FIG. 1B has a substrate 1 having a cylindrical shape or a columnar shape, and an elastic layer 2 that covers the outer peripheral surface of the substrate. Furthermore, the outer peripheral surface of the elastic layer 2 may have a surface layer (mold release layer) 4. Furthermore, the electrophotographic roller may also have an adhesive layer 3 between the elastic layer 2 and the surface layer 4.

FIG. 3 is a schematic view of the peripheral direction cross-sectional surface of the elastic layer of the electrophotographic member, i.e., the cross-sectional surface of the electrophotographic member in the direction orthogonal to the longitudinal direction in FIG. 1A and FIG. 1B. The elastic layer contains a cured product of an addition-curable liquid silicone rubber mixture, and the cured product contains a cured silicone rubber (a cured product 2d of the addition-curable liquid silicone rubber) as a matrix and graphite particles 2b dispersed in the matrix. These will be mentioned below.

(2) Elastic Layer

The elastic layer can be formed by curing an addition-curable liquid silicone rubber mixture (an addition-curable liquid silicone rubber composition) containing at least graphite particles and an addition-curable liquid silicone rubber (component). That is, the above-mentioned elastic layer can be a cured product (a solidified product) of an addition-curable liquid silicone rubber mixture, and can contain, at least a cured product 2a of the addition-curable liquid silicone rubber and the graphite particles 2b.

The addition-curable liquid silicone rubber can contain an organopolysiloxane having an unsaturated aliphatic group, an organopolysiloxane having active hydrogen bound to silicon as a crosslinking agent, and a catalyst (for example, a platinum compound).

The electrophotographic member (a fixing roller, a fixing film and a fixing belt and the like) can be used as either one or both of a heating member and a pressurizing member. In a case where the electrophotographic member is used as a heating member, the elastic layer functions as a layer for imparting elasticity for following the unevenness on a paper sheet during fixing. Furthermore, in a case where the electrophotographic member is used as a pressurizing member, the elastic layer functions as a layer that imparts elasticity for ensuring a nip width during fixing. In expressing these functions, for a base material for forming the elastic layer, it is desirable to use an uncured silicone rubber. The uncured silicone rubber generally includes an addition-curable liquid silicone rubber and a millable type silicone rubber, and the present disclosure uses an addition-curable liquid silicone rubber from the viewpoint that the graphite particles and the filler are easily dispersed.

The addition-curable liquid silicone rubber mixture for use in the preparation of the elastic layer will be explained below.

(2-1) Addition-Curable Liquid Silicone Rubber Mixture

The addition-curable liquid silicone rubber mixture contains an addition-curable liquid silicone rubber and graphite particles. The addition-curable liquid silicone rubber mixture can further contain a filler, which will be mentioned below.

FIG. 2 schematically represents an example of the addition-curable liquid silicone rubber mixture. As shown in FIG. 2, the addition-curable liquid silicone rubber mixture contains (a liquid component of) an addition-curable liquid silicone rubber 2a, graphite particles 2b and a filler 2c such as titanium oxide. Subsequently, the respective components contained in the addition-curable liquid silicone rubber mixture will be explained in detail.

(2-1-1) Addition-Curable Liquid Silicone Rubber (Addition-Curable Liquid Silicone Rubber Component)

As mentioned above, the addition-curable liquid silicone rubber can contain (a) an organopolysiloxane having an unsaturated aliphatic group, (b) an organopolysiloxane having active hydrogen bound to silicon, and (c) a hydrosilylation (addition curing) catalyst (for example, a platinum compound). The content of the addition-curable liquid silicone rubber component in the addition-curable liquid silicone rubber mixture is not specifically limited, and can be appropriately preset depending on the kind of the used filler, and the like.

Component (a): Organopolysiloxane Having an Unsaturated Aliphatic Group

As the organopolysiloxane having an unsaturated aliphatic group (hereinafter sometimes referred to as "component (a)"), any organopolysiloxane having an unsaturated aliphatic group can be used as long as it is an organopolysiloxane having an unsaturated aliphatic group such as a vinyl group. For example, those respectively represented by the following Structural Formulas 1 to 3 can be used as the component (a).

A linear organopolysiloxane having one or both of intermediate unit(s) selected from the group consisting of an intermediate unit represented by $R_1R_1SiO$ and an intermediate unit represented by $R_1R_2SiO$, and a molecular terminal represented by $R_1R_1R_2SiO_{1/2}$ (see the following Structural Formula 1).

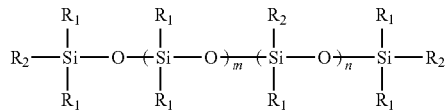

Structural Formula 1

In Structural Formula 1, $R_1$ each independently represents a monovalent unsubstituted or substituted hydrocarbon group containing no unsaturated aliphatic group, $R_2$ each independently represents an unsaturated aliphatic group, m and n each independently represents an integer of 0 or more, provided that m+n represents an integer of 1 or more.

A branched organopolysiloxane having one or both of intermediate unit(s) selected from the group consisting of an intermediate unit represented by $R_3SiO_{3/2}Y$ and an intermediate unit represented by $SiO_{5/2}YY$, and a molecular terminal represented by $R_3R_3R_4SiO_{1/2}$ (see the following Structural Formula 2).

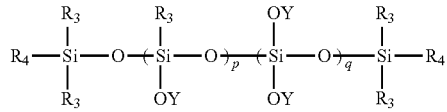

Structural Formula 2

In Structural Formula 2, $R_3$ each independently represents a monovalent unsubstituted or substituted hydrocarbon group containing no unsaturated aliphatic group, $R_4$ each independently represents an unsaturated aliphatic group, Y represents an organopolysiloxane, p and q each independently represents an integer of 0 or more, provided that p+q represents an integer of 1 or more.

A linear organopolysiloxane having a molecular terminal represented by $R_5R_5R_5SiO_{1/2}$ and an intermediate unit represented by $R_5R_6SiO$, and an intermediate unit represented by $R_5R_5SiO$ as necessary (see the following Structural Formula 3).

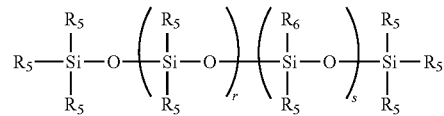

Structural Formula 3

In Structural Formula 3, $R_5$ independently represents a monovalent unsubstituted or substituted hydrocarbon group containing no unsaturated aliphatic group, $R_6$ each independently represents an unsaturated aliphatic group, r represents an integer of 0 or more, and s represents an integer of 3 or more.

In Structural Formulas 1 to 3, examples of the monovalent unsubstituted or substituted hydrocarbon groups having no unsaturated aliphatic group respectively represented by $R_1$, $R_3$ and $R_5$ can include the following groups.

Unsubstituted Hydrocarbon Groups

Alkyl groups (for example, a methyl group, an ethyl group, a propyl group, a butyl group, a pentyl group, a hexyl group and the like); aryl groups (for example, a phenyl group and the like).

Substituted Hydrocarbon Groups

For example, a chloromethyl group, a 3-chloropropyl group, a 3,3,3-trifluoropropyl group, a 3-cyanopropyl group, a 3-methoxypropyl group and the like.

In the above-mentioned formulas, it is preferable that either of $R_1$, $R_3$ and $R_5$ is a methyl group, since the synthesis and handling are easy and the production is easy. That is, as the component (a), an organopolysiloxane in which methyl groups are bound to the silicon atoms constituting the main chain is preferably used.

Furthermore, in Structural Formulas 1 to 3, examples of the unsaturated aliphatic groups bound to a silicon atom respectively represented by $R_2$, $R_4$ and $R_6$ can include a vinyl group, an allyl group, a 3-butenyl group, a 4-pentenyl group, a 5-hexenyl group and the like. In the above-mentioned formulas, it is preferable that either of $R_2$, $R_4$ and $R_6$ is a vinyl group since the synthesis and handling are easy and inexpensive, and the crosslinking reaction is easily conducted.

Examples of the organopolysiloxane represented by Y in Structural Formula 2 can include other branched organopolysiloxanes represented by Structural Formula 2. In this case, the branched organopolysiloxane represented by Structural Formula 2 can have a structure in which plural branched organopolysiloxanes that are similar to that represented by Structural Formula 2 are bonded via oxygen atoms (siloxane bonds).

Specific examples of the component (a) that is preferably used can include an organopolysiloxane having a structure in which methyl groups are directly bonded to the silicon atoms constituting the siloxane bonds of the main chain, and an unsaturated aliphatic group is introduced in a terminal of the side chain or the molecule can be exemplified. More specifically, for example, organopolysiloxanes that are respectively represented by the following Structural Formula 4 and Structural Formula 5 can be exemplified. Among these, the organopolysiloxane having an unsaturated aliphatic group at the molecular terminal represented by Structural Formula 5 is more preferable since it can be easily synthesized and inexpensive.

Structural Formula 4

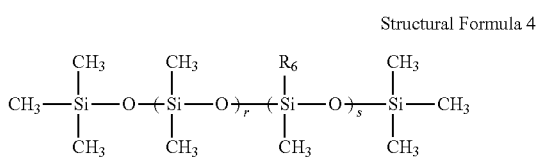

In Structural Formula 4, $R_6$ each independently represents an unsaturated aliphatic group, r represents an integer of 0 or more, and s represents an integer of 3 or more.

Structural Formula 5

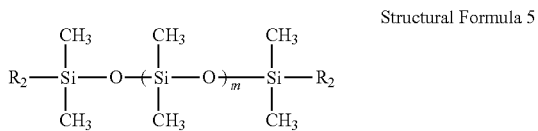

In Structural Formula 5, $R_2$ each independently represents an unsaturated aliphatic group, and m represents a positive integer.

The component (a) may be used by solely one kind, or as a combination of two or more kinds. For example, as the component (a), the organopolysiloxane represented by the above-mentioned Structural Formula 4 and the organopolysiloxane represented by the above-mentioned Structural Formula 5 may be blended and used.

From the viewpoint of making the moldability of the addition-curable liquid silicone rubber mixture easier, the weight average molecular weight of the component (a) is preferably, for example, 20,000 to 70,000, and the kinematic viscosity at a temperature of 25° C. is preferably 1,000 to 10,000 mm²/sec.

The weight average molecular weight of the component (a) can be measured by gel permeation chromatography (GPC) as a weight average molecular weight in terms of polystyrene.

The weight average molecular weight of the component (a) herein can be measured by using a method for measuring molecular weight distribution by GPC under the following conditions.

A column is stabilized in a temperature in a heat chamber at 40° C., and toluene as a solvent is flown in the column at this temperature at a flow rate of 1 mL/min. A toluene sample solution (100 μL) of the component (a) prepared to have a sample concentration (the concentration of the component (a)) of 0.3% by mass is injected into the column, and the molecular weight of the sample is measured. In the measurement of the molecular weight of the sample, the molecular weight distribution possessed by the sample is calculated from the logarithmic values of a calibration curve prepared by several kinds of monodispersed polystyrene standard samples (trade name: TSK gel standard polystyrenes "0005202" to "0005211" manufactured by Tosoh Corporation) and the retention times. Furthermore, a GPC gel permeation chromatography analyzer (trade name: HLC8220, manufactured by Tosoh Corporation) is used as the GPC apparatus, and a differential refractive index detector (trade name: RI-8020, manufactured by Tosoh Corporation) is used as the detector. As the column, three pieces of commercially available polystyrene gel columns (trade name: Shodex GPC LF-804, manufactured by Showa Denko K. K.) are used in combination.

Furthermore, the kinematic viscosity η (mm²/sec) of the organopolysiloxane having an unsaturated aliphatic group can be calculated from the following Calculation Formula 1, for example, by using a viscosity (stickiness) μ (mPa·s) measured by a rotary viscometer (trade name: RV1, manufactured by Eko Instruments) or the like.

$$\eta = \mu/\rho \qquad \text{Calculation Formula 1}$$

In the formula, ρ is a density, and in a case of an organopolysiloxane, the density is 0.97 g/cm³ under an ordinary temperature and an ordinary pressure (for example, temperature: 25° C., pressure: 1,013 hPa).

As the liquid addition-curable silicone rubber, a liquid addition-curable silicone rubber in which the component (a) contains unsaturated aliphatic groups in an amount of 0.1 mol % or more and 2.0 mol % or less with respect to 1 mol of the silicon atoms in the component (a). More preferably, the amount is 0.2 mol % or more and 1.0 mol % or less with respect to 1 mol of the silicon atoms. It is desirable that the use amount of the component (a) is appropriately preset so as to satisfy these ranges.

Component (b): Organopolysiloxane Having Active Hydrogen Bound to Silicon (Crosslinking Agent)

The organopolysiloxane having active hydrogen bound to silicon (hereinafter sometimes referred to as component (b)) functions as a crosslinking agent that forms a crosslinked structure by a hydrosilylation reaction with the unsaturated aliphatic group in the component (a) by the catalytic action of the platinum compound.

Any organopolysiloxane can be used as the component (b) as long as it is an organopolysiloxane having Si—H bonds, and for example, those satisfying the following conditions can be preferably used. The component (b) may be used by solely one kind, or may be used by two or more kinds in combination (as a mixture).

An organopolysiloxane having Si—H bonds in which the number of the hydrogen atoms bound to the silicon atom is three or more in a molecule on average, from the viewpoints of formation of crosslinked structures by a reaction with the organopolysiloxane having an unsaturated aliphatic group.

An organopolysiloxane having Si—H bonds in which the organic group bound to the silicon atom is, for example, the monovalent unsubstituted or substituted hydrocarbon group as mentioned above. In addition, this organic group is preferably a methyl group due to easy synthesis and handling.

The siloxane backbone (—Si—O—Si—) may be either of linear, branched and cyclic siloxane backbones, and a linear siloxane backbone is preferable since it is easily synthesized.

The Si—H bond may be present in any of the siloxane units in the molecule.

Specific examples of the component (b) can include a linear organopolysiloxane represented by the following Structural Formula 6, and a cyclic crosslinking agent silicone polymer represented by the following Structural Formula 7.

Structural Formula 6

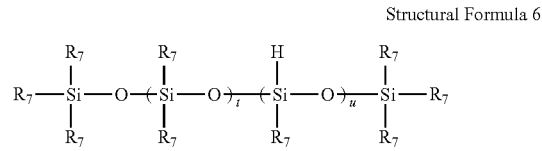

In Structural Formula 6, $R_7$ each independently represents a monovalent unsubstituted or substituted hydrocarbon group containing no unsaturated aliphatic group, t represents an integer of 0 or more, and u represents an integer of 3 or more.

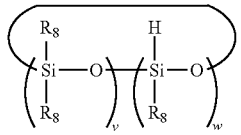

Structural Formula 7

In Structural Formula 7, $R_8$ each independently represents a monovalent unsubstituted or substituted hydrocarbon group containing no unsaturated aliphatic group, v represents an integer of 0 or more, and w represents an integer of 3 or more.

Either of $R_7$ and $R_8$ can be a monovalent unsubstituted or substituted hydrocarbon group containing no unsaturated aliphatic group bound to a silicon atom, which is mentioned in Structural Formulas 1 to 3. Specifically, it is preferable that 50% or more is methyl groups in $R_7$ of Structural Formula 6 and $R_8$ of Structural Formula 7, respectively, and it is more preferable that all of $R_7$ and $R_8$ are methyl groups, since the synthesis and handling are easy and excellent heat resistance can be obtained.

The molecular weight of the component (b) is not specifically limited. Furthermore, in a case where the component (b) is used as an elastic layer of an electrophotographic member, the kinematic viscosity of the component (b) at a temperature of 25° C. is preferably 10 to 10,000 mm²/sec. If the kinematic viscosity is within this range, volatilization during storage is easily suppressed, and the desired degree of crosslinking and the desired physical properties of a molded article are easily obtained. Furthermore, the component (b) can be easily synthesized and handled, and can be easily and homogeneously dispersed in the reaction system.

In order to calculate the kinematic viscosity, the viscosity (consistency) p in the afore-mentioned calculation formula (1) is measured. Examples of measuring methods for the viscosity μ in the calculation formula (1) includes following method. That is, first, on a sample plate of the afore-mentioned rotary viscometer, a sample of which the viscosity is to be measured, such as addition-curable liquid silicone rubber composition, is coated. Then, a rotation plate is put on the sample plate with a gap of 105 μm to sandwich the sample coated on the sample plate between the rotation plate and the sample plate. Next, sharing force is applied to the sandwiched sample by rotating the rotation plate and the viscosity of the sample is measured. The share rate is controlled as to increase from 0 s$^{-1}$ to 20 s$^{-1}$ at the rate of 0.2 s$^{-1}$ per second, and then decrease from 20 s$^{-1}$ to 0 s$^{-1}$ at the rate of 0.2$^{-1}$ per second. Among the measured values during the measurement, the maximum value is employed as a representative value.

As the liquid addition-curable silicone rubber, a liquid addition-curable silicone rubber in which the amount of the active hydrogen groups bound to the silicon in the component (b) is 5 mol % or more and 50 mol % or less with respect to 1 mol of the silicon atoms in the component (b) is preferable. More preferably, the amount is 15 mol % or more and 40 mol % or less with respect to 1 mol of the silicon atoms. It is desirable to appropriately preset the use amount of the component (b) so as to satisfy these ranges.

(c) Catalyst

As the hydrosilylation (addition curable) catalyst, for example, a platinum compound can be used. As this platinum compound, for example, the following platinum compounds can be used. Specifically, platinum carbonylcyclovinylmethylsiloxane-complex vinylmethylcyclosiloxane and platinum divinyltetramethyldisiloxane complex, and the like.

(2-1-2) Graphite Particles

As the graphite particles, either of particles of artificial graphite and particles of natural graphite can be used. As the particles of natural graphite, particles formed by pulverizing naturally occurring graphite to form microparticles can be used. Furthermore, the artificial graphite is obtained by pulverizing coke as a raw material, molding the coke into a rod shape or the like, and subjecting the molded coke to a graphitizing treatment at a high temperature. A product obtained by pulverizing artificial graphite that has been graphitized as such and classifying the pulverization product can be used. Meanwhile, the graphite has a hexagonal plate-shaped crystal, and also has a layered structure. Graphite particles may be used singly, or two or more kinds thereof may be used in combination.

(i) Oil Absorbing Property

The oil absorbing property of the graphite particles is represented by a DBP oil absorption number measured by the method provided by JIS K6217-4:2008 (Carbon Black for Rubbers—Basic Property—Part 4: Method for Obtaining Oil Adsorption Amount (Compression Material is contained)). As a specific measurement method, for example, the following method can be exemplified. That is, at first, 20 g of graphite particles is measured by using an apparatus for measuring absorption amount (trade name: S410C, manufactured by Asahi Souken Corporation) and put into a mixing chamber of the apparatus. In the mixing chamber, the graphite particles are mixed by rotary blades by motor driving at 125 rpm, DBP is added dropwise at a predetermined dropwise addition rate and allowed to be absorbed by the graphite particles, and the torque at that time can be measured. The torque measured at that time raises over time, and when the graphite particles have become impossible to absorb DBP in due course, the surroundings of the graphite particles are covered with DBP, and the torque is rapidly lowered. The 70% timepoint of the largest torque is judged as an endpoint, and a DBP oil absorption number (cm³/100 g) with respect to the graphite particles is calculated from the amount of the dropwise-added DBP.

In addition, as in the elastic layer represented by FIG. 3, in a case where the graphite particles are contained in the silicone rubber in a dispersed state, it is sufficient to isolate the graphite particles by the following method from the silicone rubber and measure the DBP oil absorption number. That is, it is sufficient to heat the silicone rubber containing the graphite particles at a high temperature of 500° C. or more under a nitrogen atmosphere, remove the silicone rubber by asking, isolate the graphite particles, and measure the DBP oil absorption number.

The graphite particles have an oil absorbing property and tend to have high affinity with organic compounds. Therefore, it is considered that, when the graphite particles are incorporated in an uncured addition-curable liquid silicone rubber mixture, the graphite particles absorb the component (a) and the component (b). Specifically, in a case where these polymers (organopolysiloxane) have relatively low molecular weights, the molecules are small, and thus easily enter into the graphite particles and are easily absorbed. Therefore, if heat or the like is applied to the above-mentioned addition-curable liquid silicone rubber mixture, these polymers do not contribute to a curing reaction, and consequently, it is considered that the hardness of the cured silicone rubber mixture becomes smaller than a desired hardness. Furthermore, it is considered that, if heat is continuously added to the obtained cured product or heating is conducted at a high temperature during use, the polymer absorbed by the graphite particles leaves from the graphite particles and thus a cure reaction occurs.

In the addition-curable liquid silicone rubber mixture of the present embodiment, graphite particles having an DBP oil absorption number of 40 cm$^3$/100 g or more and lower than 80 cm$^3$/100 g are incorporated as the graphite particles. Graphite particles having a DBP oil absorption number of lower than 40 cm$^3$/100 g are substantially difficult to be produced. Furthermore, when the graphite particles have a DBP oil absorption number of 80 cm$^3$/100 g or more, there are some cases where the addition-curable liquid silicone rubber mixture is not cured and thus molding defect occurs, and is not sufficiently cured and an elastic layer having a desired hardness cannot be stably obtained.

(ii) Content

The content (content ratio) of the graphite particles in the addition-curable liquid silicone rubber mixture is preferably within a range of 20% by mass or more and lower than 70% by mass on the basis of the addition-curable liquid silicone rubber mixture. If the content of the graphite particles is lower than 70% by mass, the oil absorbing total amount of the graphite particles is easily adjusted to an appropriate amount, and the change in hardness over time of the addition-curable liquid silicone rubber mixture is easily suppressed to be low. Furthermore, if the content of the graphite particles is 20% by mass or more, sufficient heat conductivity can be ensured. Furthermore, the content of the graphite particles in the addition-curable liquid silicone rubber mixture is 48% by mass or more on the basis of the addition-curable liquid silicone rubber mixture from the viewpoint of further ensuring of heat conductivity, and the content is more preferably 60% by mass or less in view of moldability.

The mass of the platinum compound is included in the total mass of the above-mentioned addition-curable liquid silicone rubber mixture.

Furthermore, in a case where the addition-curable liquid silicone rubber mixture is cured by an addition reaction to form a cured product, the weight is not changed from the weight before the curing, and thus the content of the graphite particles in the cured product of the addition-curable liquid silicone rubber mixture is not changed. For example, in a case where the addition-curable liquid silicone rubber mixture is cured to form an elastic layer, it is preferable to set the content (filling amount) of the above-mentioned graphite particles to the content mentioned below for the above-mentioned reason. Specifically, the content of the graphite particles is preferably 20% by mass or more and lower than 70% by mass, more preferably 48% by mass or more and 60% by mass or less on the basis of the cured product of the addition-curable liquid silicone rubber mixture.

The respective contents of the cured product of the addition-curable liquid silicone rubber and the graphite particles in the elastic layer can be measured by a thermogravimetric analyzer (for example, TGA/SDTA851e (trade name), manufactured by Mettler Toledo AG).

Specifically, about 20 to 50 mg of a part of the elastic layer is cut out of the electrophotographic member by using an edged tool or the like as a sample, and the sample is measured by using an alumina pan.

Firstly, the above-mentioned sample put on the alumina pan is put into a sample chamber, and the temperature of the sample chamber is raised from room temperature (25° C.) to 1,100° C. at a temperature rising rate of 20° C./min under a nitrogen atmosphere. Furthermore, the sample is kept constant at 1,100° C. for 30 minutes under a nitrogen atmosphere to thermally decompose the addition-curable liquid silicone rubber (cured product). Thereafter the graphite particles are combusted under a high temperature oxygen atmosphere with keeping the temperature at 1,100° C. The mass ratios of the addition-curable liquid silicone rubber (cured product) and the graphite particles contained in the sample can be respectively confirmed from the measured masses decreased at that time. From those measurement results, the respective contents of the addition-curable liquid silicone rubber (cured product) and graphite particles in the elastic layer can be calculated.

(iii) Average Particle Diameter

The average particle diameter of the graphite particles is preferably 3 μm or more and 30 μm or less. If the average particle diameter is 3 μm or more, even the graphite particles are added at a large amount so as to improve the thermal conductivity, the increase in viscosity of the addition-curable liquid silicone rubber before curing can be easily suppressed. Furthermore, if the average particle diameter is 30 μm or less, the roughening of a rubber surface of an electrophotographic member, which leads to an uneven image quality with granular feeling, can be easily suppressed.

Furthermore, it is more preferable to set the average particle diameter of the graphite particles to 5 μm or more in view of viscosity, and to 15 μm or less in view of homogeneity of hardness.

The average particle diameter of the graphite particles can be measured by a laser diffraction-scattering particle diameter distribution meter (trade name: MT3100II, Microtrac-BEL Corporation). The average particle diameter of the graphite particles herein means a so-called median diameter. The median diameter means a particle diameter when an accumulation is 50% in a graph in which a volume average particle diameter is represented as an accumulated distribution when particle diameter distribution is measured.

(2-1-3) Filler

The addition-curable liquid silicone rubber mixture can contain, besides the graphite particles, titanium oxide, iron oxide, silica or the like as a filler for improving heat-resistance and durability. The kind and content of the filler in the addition-curable liquid silicone rubber mixture may be appropriately selected and adjusted within a scope in which the effect of the present disclosure is not deteriorated.

(2-2) Thickness of Elastic Layer

In the electrophotographic belt, it is preferable to preset the thickness of the elastic layer to 0.1 mm or more and 1.0 mm or less from the viewpoint of sufficiently imparting flexibility as an elastic layer and ensuring heat conductivity.

Furthermore, in the electrophotographic roller, the thickness of the elastic layer is preset to preferably 2.0 mm or more and 5.0 mm or less, more preferably 2.5 mm or more and 4.0 mm or less, from the viewpoint of sufficiently imparting flexibility as an elastic layer and ensuring heat conductivity.

(2-3) Thermal Conductivity in Thickness Direction of Elastic Layer

The thermal conductivity (λ) in the thickness direction of the elastic layer is preferably set to 1.1 W/(m~K) or more and 5.0 W/(m·K) or less. By setting the thermal conductivity to 1.1 W/(m·K) or more, the heat can be allowed to transmit more efficiently from the rear surface of the elastic layer of the electrophotographic member to the surface. The surface of the electrophotographic member herein refers to a surface that is brought into contact with a toner. The method for measuring the thermal conductivity will be mentioned below.

(2-4) Method for Forming Elastic Layer

The elastic layer can be formed by a method such as a ring coat process, a blade coat process, a nozzle coat process or a metallic molding process (see Japanese Patent Application Laid-Open No. 2001-62380 and Japanese Patent Application Laid-Open No. 2002-213432). By heating and crosslinking the addition-curable liquid silicone rubber mixture carried on the substrate, the elastic layer can be formed on the substrate. In addition, ultraviolet ray can also be used during the curing of the addition-curable liquid silicone rubber mixture.

(3) Substrate (Base Material)

In an electrophotographic belt, a substrate having an endless belt shape is used. As the material, metals such as nickel alloys and stainless steel, and resins such as polyimides can be used. An adhesive layer can be disposed on the outer peripheral surface of the substrate so as to impart a function to improve the adhesiveness with the elastic layer. That is, the elastic layer is disposed on the outer peripheral surface of the substrate, and another layer such as an adhesive layer can be disposed between the elastic layer and the substrate. Furthermore, a protective layer for suppressing wearing due to contact with a heater and a sliding layer for improving slidability with the heater can be disposed on the inner peripheral surface of the substrate.

In an electrophotographic roller, a substrate having a columnar or cylindrical shape is used. As the material, metals such as aluminum and iron, and heat-resistant resins such as polyimides can be used.

(4) Surface Layer (Mold Release Layer)

It is preferable that the surface layer as a mold release layer contains, for example, a fluorine resin so that a toner is difficult to adhere to the surface of the electrophotographic member. Specific examples of the fluorine resin include the following fluorine resins. Tetrafluoroethylene-perfluoro (alkyl vinyl ether) copolymers (PFAs), polytetrafluoroethylene (PTFE) and tetrafluoroethylene-hexafluoropropylene copolymers (FEPs).

Furthermore, the surface layer may contain a filler for the purpose of controlling thermal and physical properties and durability within a scope in which the moldability and mold release property are not deteriorated.

The thickness of the surface layer is preferably set to 10 µm or more and 100 µm or less. If the thickness of the surface layer is 10 µm or more, sufficient durability can be easily obtained, and if the thickness is 100 µm or less, the elasticity of the elastic layer is maintained when the surface layer is laminated on the elastic layer, whereby excess increase in the surface hardness of the electrophotographic member (for example, a heating member) can be easily suppressed.

(4-1) Method for Forming Surface Layer

The method for forming the surface layer is not specifically limited, and for example, the following method can be used. That is, a method including molding a fluorine resin into a tubular shape, and coating the molded fluorine resin on an elastic layer via an adhesive layer, and a method including coating microparticles of a fluorine resin directly on a surface of an elastic layer, or dispersing the microparticles in a solvent to form a coating material and coating the coating material on the surface of the elastic layer, drying the coating, and melting and baking the coating. Hereinafter these methods will be explained in detail.

(4-1-1) Formation of Surface Layer by Coating of Fluorine Resin Tube

By subjecting the inner surface of the fluorine resin tube to a sodium treatment, an excimer laser treatment, an ammonia treatment or the like in advance, the surface can be activated, and thus the adhesiveness can be improved.

Figure 4:
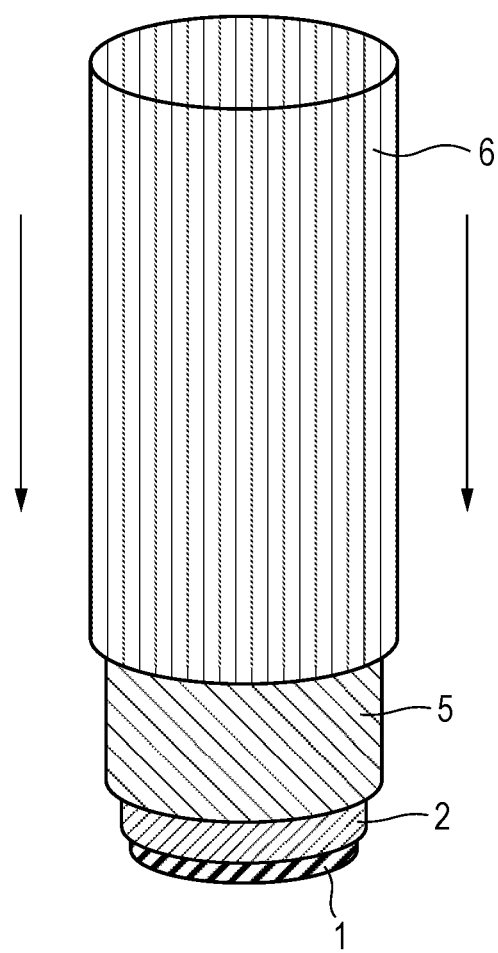
FIG. 4 is a schematic view of an example for explaining laminating of a fluorine resin surface layer.

FIG. 4 is a schematic view of an example for explaining coating of a fluorine resin tube 6 on an elastic layer 2 as a surface layer via an adhesive layer 5.

Specifically, an adhesive is applied on the surface of the elastic layer 2 to form the adhesive layer 5. The adhesive will be mentioned below in detail. The fluorine resin tube 6 as a surface layer is coated on the outer surface of the adhesive layer 5, and laminated.

As the above-mentioned adhesive, an addition-curable silicone rubber containing a self-adhesion component is preferably used. As this silicone rubber, a silicone rubber containing an organopolysiloxane having a plurality of unsaturated aliphatic groups represented by a vinyl group in the molecular chain, a hydrogen organopolysiloxane, and a platinum compound as a crosslinking catalyst can be specifically used. This silicone rubber is cured by an addition reaction. As the adhesive formed of such addition-curable silicone rubber, a known adhesive can be used.

In addition, in a case where a thin substrate such as a resin belt or a metal sleeve for use in a belt-shaped heating member is used, it is desirable to retain the substrate 1 by fitting the substrate 1 on a core so as to prevent deformation during processing, but such retention is not necessary in a case where the substrate 1 is a core metal capable of retaining a shape.

The method for coating the fluorine resin tube 6 is not specifically limited, a method including coating an adhesive as a lubricant, a method including extending a fluorine resin tube from 6 the outside, and coating, and the like can be used.

After the coating, the excess adhesive remaining between the elastic layer 2 and the fluorine resin tube 6 can be removed by stroking the elastic layer 2 and the fluorine resin tube 6 to take out the adhesive by using a tool that is not illustrated. The thickness of the adhesive layer 5 after the stroking is preferably 20 µm or less. If the thickness of the adhesive layer is 20 µm or less, the raising of the hardness of an electrophotographic member is easily suppressed, and in a case where the electrophotographic member is used as a heating member, the followability to unevenness on paper is fine, and in a case where the electrophotographic member is used as a pressurizing member, the nip width is not narrowed during fixing, and thus a fine fixed image can be easily obtained. Secondly, the adhesive layer is cured by heating by a heating unit such as an electric furnace for a predetermined time, and processing the both ends into a desired length as necessary, whereby the electrophotographic member of the present disclosure can be obtained.

(4-1-2) Formation of Surface Layer by Fluorine Resin Coating

For the coating processing of the fluorine resin for forming the surface layer, methods such as a method for electrostatically coating fluorine resin microparticles and a method for spray coating a fluorine resin coating material can be used.

In a case where an electrostatic coating method is used, firstly, an electrostatic coating of fluorine resin microparticles is applied to an inner surface of a mold, and the mold is heated to the melting point of the fluorine resin or more to thereby form a thin film of the fluorine resin on the inner surface of the mold. The inner surface is then subjected to an adhesion treatment, a substrate is inserted, an elastic layer material is injected to between the substrate and the fluorine resin and cured, and the product is released from the mold together with the fluorine resin, whereby the electrophotographic member of the present disclosure can be obtained.

In a case where spray coating is used, a coating material of a fluorine resin is used. The fluorine resin coating material forms a so-called dispersion liquid in which microparticles of the fluorine resin are dispersed in a solvent by a surfactant or the like. The fluorine resin of the dispersion liquid is also commercially available and thus can be easily obtained. This dispersion liquid is fed to a spray gun, and sprayed as mist by the pressure of a gas such as air. Where necessary, a member having an elastic layer adhesion-treated with a primer or the like is disposed on the position opposing to the spray gun, this member is rotated at a predetermined rate, and the spray gun is transferred in parallel to the axis direction of the base material. By this way, a coating of the fluorine resin coating material can be evenly formed on the surface of the elastic layer. By heating the member on which the fluorine resin coating has been formed to the melting point of the fluorine resin coating or more by using a heating unit such as an electric furnace, and thus a fluorine resin surface layer can be formed.

(5) Method for Producing Electrophotographic Member

The electrophotographic member according to an embodiment of the present disclosure can be formed by forming a coating of the addition-curable liquid silicone rubber mixture of an embodiment of the present disclosure on an outer peripheral surface of a substrate, i.e., directly on a surface of the substrate, or on a surface of another layer disposed on the surface of the substrate, and curing the addition-curable liquid silicone rubber in the coating to form an elastic layer. Furthermore, where necessary, the method can include forming a surface layer (mold release layer) or a sliding layer.

(6) Fixing Apparatus

The fixing apparatus according to an embodiment of the present disclosure will be specifically explained.

Figure 5:
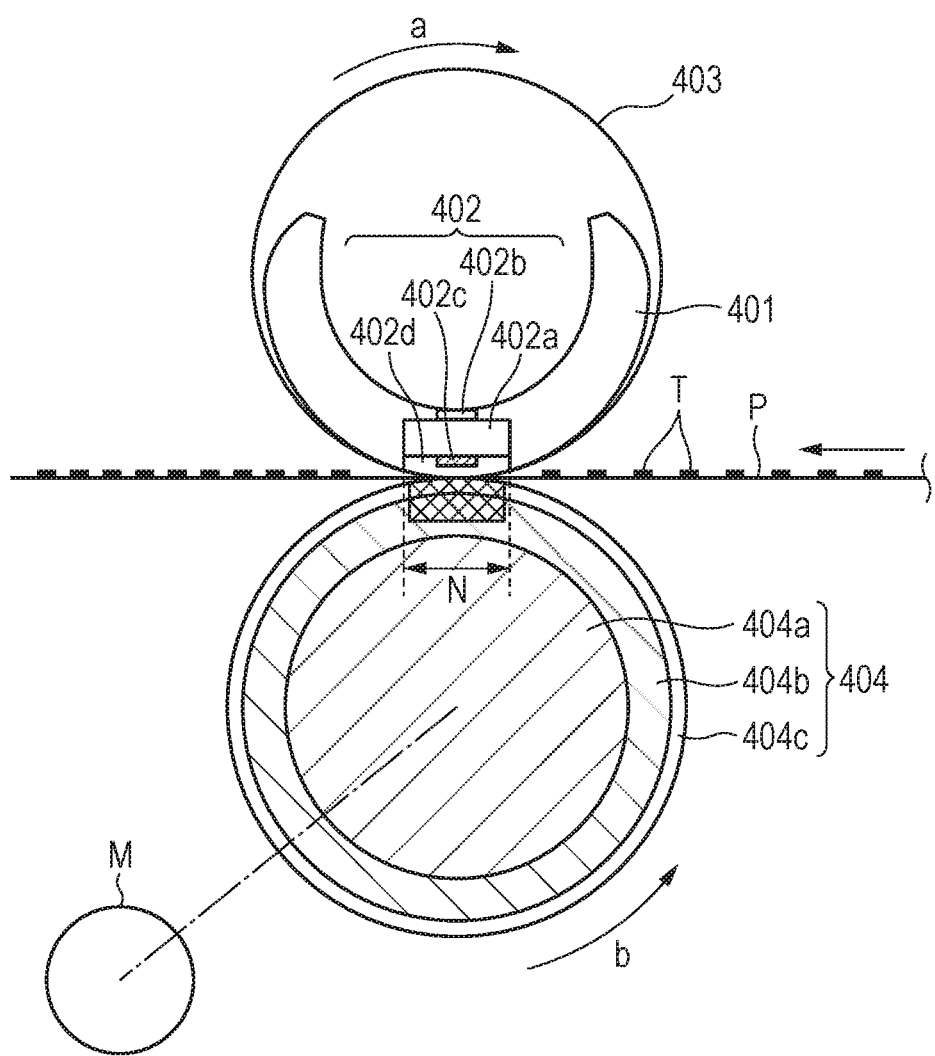
FIG. 5 is an explanatory view of a fixing apparatus of an embodiment of the present disclosure.

FIG. 5 is a cross-sectional drawing in an embodiment of the fixing apparatus. This fixing apparatus is a so-called on-demand type heat fixing apparatus, and this is a heat fixing apparatus of a film heating system using a ceramic heater as a heat source. The outline of the constitution thereof will be explained below with exemplifying an on-demand type heat fixing apparatus. The fixing apparatus in the present disclosure is not limited to this embodiment, and can also be applied to a heat roll type fixing apparatus using a halogen heater as a heat source, and a fixing apparatus of a fixing apparatus of an induction heating (IH) system in which a member itself generates heat by energizing a coil, which are generally used apparatuses.

In FIG. 5, a film guide member 401 has a horizontally long shape having a transverse-sectional surface having an approximately semicircular arc shape and a gutter form, in which the direction in parallel to the longitudinal direction of a pressurizing rotor 404 is set as a width direction.

A heater 402 is a horizontally long heater that is housed and retained in a groove formed along the width direction at approximately the center of the lower surface of the film guide member 401. An electrophotographic belt 403 in an embodiment of the present disclosure is fit on the film guide member 401 to which the heater 402 is attached. The heater 402 and the electrophotographic belt 403 are the constitutional members of the heating unit of the fixing apparatus in FIG. 5, and the heater 402 is a member to heat the electrophotographic belt 403, which functions as a heating member for heating a toner by directly contacting with the toner. Furthermore, the heater 402 is disposed on the inner side of the electrophotographic belt 403 in contacting with (the inner peripheral surface of) the substrate of the electrophotographic belt 403 (of the endless belt shape).

The film guide member 401 is, for example, a molded article formed of a heat-resistant resin such as PPS (polyphenylene sulfite) or a liquid crystal polymer.

The heater 402 has, for example, a constitution in which a heat generation resistor body is disposed on a ceramic substrate. The heater 402 has a horizontally long and thin plate-shaped heater substrate 402a made of alumina, and a linear or thin band-shaped energization heat generator made of Ag/Pd (heat generation resistant body) 402c, which is formed and included on the surface side (film sliding surface side) along the longitudinal direction of the heater substrate 402a. Furthermore, the heater 402 has a thin surface protective layer 402d made of glass, which covers and protects the energization heat generator 402c. Furthermore, a thermistor (thermometry member) 402b is in contact with the rear surface side of the heater substrate 402a. The heater 402 can raise the temperature by feeding an electrical power to the energization heat generator 402c, and can control the temperature so that a predetermined fixing temperature is maintained by an electrical power control unit (not illustrated) including the thermometry member 402b. The fixing temperature is a target temperature of the surface of the heating member (electrophotographic belt), and is appropriately preset depending on a printing rate, the kind of paper, the constitution of the heating member and the kind of a toner. A general fixing temperature is 150° C. or more and 200° C. or less.

A pressurizing rotor (pressurizing member) 404 is disposed so as to oppose to the lower surface of the heater 402, and is pressurized on the heater 402 via an electrophotographic belt (heating member) 403. The pressurizing rotor 404 is constituted by a substrate 404a, an elastic layer 404b and a surface layer 404c.

The pressurizing rotor 404 is pressurized on a surface protective layer 402d of the heater 402 via the electrophotographic belt 403 by a predetermined pressurization mechanism (not illustrated). The elastic layer 404b of the pressurizing rotor 404 is elastically deformed depending on the pressurizing force, and a nip part N having a predetermined width necessary for heat fixing of an unfixed toner image T is formed between the surface of the pressurizing rotor 404 and the surface of the electrophotographic belt 403. The pressurizing force is appropriately preset depending on the kind and size of paper, the kind of the toner, and the constitution of the fixing apparatus intended by the product. Generally, the pressurizing force is preset to from about 10 kgf (98 N) to 70 kgf (686 N). A recording material P as a material to be heated is introduced into the nip part N, and a recording material P is sandwiched and transported, whereby the recording material P is heated. The pressurizing rotor 404 is driven by rotation in the counterclockwise direction of the arrow b at a predetermined circumferential rate by the transmission of the driving force of a driving source M via gears (a power transmission mechanism) (not illustrated). The electrophotographic belt 403 follows the rotation of the pressurizing rotor 404 and rotates in the direction of the arrow a by the rotation driving of the pressurizing rotor 404 in the counterclockwise direction of the arrow b during image formation.

According to an embodiment of the present disclosure, an electrophotographic member including an elastic layer containing graphite (graphite particles) dispersed in a silicone rubber and having a high thermal conductivity in the thickness direction can be obtained. Furthermore, according to other embodiment of the present disclosure, an addition-curable liquid silicone rubber mixture having sufficient curability can be obtained. Furthermore, according to still another embodiment of the present disclosure, a fixing apparatus that can form a high-quality electrophotographic image can be obtained.

EXAMPLES

The present disclosure will be explained below more specifically by using Examples.

Example 1

(1) Preparation of Addition-Curable Liquid Silicone Rubber Mixture

As the component (a), 100 parts by mass of a silicone polymer having unsaturated aliphatic group at the both terminals (weight average molecular weight: 28000, kinematic viscosity: 1,000 mm$^2$/sec, hereinafter referred to as "Vi-1") was prepared. This silicone polymer is a silicone polymer of Structural Formula 5, wherein $R_2$ is a vinyl group, and vinyl groups have been introduced in the both terminal parts by 0.5 mol % by a silicon atom ratio in Vi-1.

Subsequently, as the component (b), 2.5 parts by mass of a silicone polymer having active hydrogen groups bound to the silicon (weight average molecular weight: 2,000, kinematic viscosity: 30 mm$^2$/sec, hereinafter referred to as "SiH-1") was metered and added to Vi-1. This silicone polymer as the component (b) is a silicone polymer of Structural Formula 6, wherein $R_7$ is a methyl group, and the active hydrogen groups bound to the silicon atoms have been introduced by an amount of 27.5 mol % in terms of a silicon atom ratio in SiH-1.

Furthermore, 0.15 parts by mass of a hydrosilylation catalyst (platinum catalyst: a 2.0% by mass solution of platinumcarbonylcyclovinylmethylsiloxane-complex in vinylmethylcyclosiloxane) was added to the mixture of the component (a) and the component (b), and the mixture was sufficiently mixed to give a base polymer (an addition-curable liquid silicone rubber).

Graphite particles a (trade name: SGL-12, manufactured by SEC Carbon Ltd., average particle diameter: 12 μm, DBP oil absorption number: 70 cm$^3$/100 g) were incorporated by 78 parts by mass in this base polymer, and the mixture was sufficiently mixed to give an addition-curable liquid silicone rubber mixture containing 43% by mass of graphite particles.

(2) Preparation of Fixing Belt

Secondly, a fixing belt was prepared as follows by using the obtained addition-curable liquid silicone rubber mixture.

As a substrate, an endless sleeve made of electroformed nickel having an inner diameter of 30 mm, a width of 400 mm and a thickness of 40 μm was prepared. During the series of production steps, the endless sleeve was handled with inserting a core into the sleeve.

Firstly, a primer (trade name: DY39-051 A/B, manufactured by Dow Corning Toray Co., Ltd.) was applied in an approximately homogeneous manner on an outer peripheral surface of a substrate, the solvent was dried, and a baking treatment was conducted in an electric furnace at 160° C. for 30 minutes.

The above-mentioned addition-curable liquid silicone rubber mixture was applied at a thickness of 300 μm on the primer-treated substrate by a ring coat process. The endless belt to which the silicone rubber mixture had been applied was heated in an electric furnace at 160° C. for 1 minute (primary curing), and further heated in an electric furnace preset to 200° C. for 4 hours to cure the silicone rubber mixture (secondary curing).

Secondly, the silicone mixture surface that had undergone the secondary curing was irradiated with ultraviolet ray by using an ultraviolet lamp installed at a distance of 10 mm from the surface while rotating the surface of the obtained endless belt at a transfer rate of 20 mm/sec in the peripheral direction. As the ultraviolet lamp, a low-pressure mercury ultraviolet lamp (trade name: GLQ500US/11, manufactured by Toshiba Lightening & Technology Corporation (former Harison Toshiba Lightening Corporation)), and irradiation at 100° C. for 5 minutes was conducted in an atmospheric atmosphere to form an elastic layer.

Secondly, after cooling to room temperature, an addition-curable silicone rubber adhesive (trade name: SE1819CV A/B, manufactured by Dow Corning Toray Co., Ltd.) was homogeneously applied on the surface of this elastic layer of the endless belt so as to have a thickness of 20 μm.

Secondly, a fluorine resin tube having an inner diameter of 29 mm and a thickness of 20 μm (trade name: KURAFLON-LT, manufactured by Kurabo Industries, Ltd.) was laminated on this adhesive. Thereafter the surface of the belt was homogeneously stroked from above the fluorine resin tube, whereby the excess adhesive was stroked so as to be sufficiently thin from between the elastic layer and the fluorine resin tube.

The obtained endless belt was heated in an electric furnace preset to 200° C. for 1 hour to cure the adhesive, whereby said fluorine resin tube (surface layer) was fixed on the elastic layer. The both ends of the obtained endless belt were cut to give a fixing belt having a width of 343 mm.

(3) Evaluation of Properties of Fixing Belt (Thermal Conductivity and Hardness of Elastic Layer)

Initially, a primer treatment was conducted on a substrate by the same method as the above-mentioned method for the preparation of a fixing belt, and an elastic layer having a thickness of 300 μm (an elastic layer after secondary curing) by a ring coat process.

(3-1) Thermal Conductivity in Thickness Direction of Elastic Layer

The thermal conductivity (λ) in the thickness direction of the elastic layer was calculated from the following Calculation Formula 2.

$$\lambda = \alpha \times C_p \times \rho \qquad \text{Calculation Formula 2}$$

(In Calculation Formula 2, λ represents a thermal conductivity (W/(m·K)) in the thickness direction of the elastic layer, α represents a thermal diffusion rate (mm$^2$/sec) in the thickness direction, $C_p$ represents a constant pressure specific heat (J/(g·K)), and ρ represents a true density (g/cm$^3$)).)

The respective values of the thermal diffusion rate in the thickness direction of the elastic layer, the constant pressure specific heat and the true density were obtained by the following methods.

Thermal Diffusion Rate (α)

The thermal diffusion rate in the thickness direction of the elastic layer was obtained by using a periodic heating method thermal physical property measurement apparatus (trade name: FTC-1, manufactured by Ulvac-Riko, Inc.) under a room temperature (25° C.) condition. As sample pieces, sample pieces each having a surface area of 8×12 mm and a thickness of 250 µm were cut by a cutter from the part of 250 µm of the elastic layer, which was obtained by removing 25 µm from the surface layer side and 25 µm from the substrate side from 300 µm of the elastic layer, whereby five sample pieces in total were prepared. Measurements were conducted five times in total on each sample, and the average value of the five samples was 0.58 mm²/sec.

Constant Pressure Specific Heat ($C_p$)

The constant pressure specific heat of the elastic layer was measured by using a differential scanning calorimeter (trade name: DSC823e, manufactured by Mettler Toledo International Inc.).

Specifically, aluminum pans were used as a sample pan and a reference pan. Firstly, as a blank measurement, a measurement was conducted by a program in which these two pans were kept in an empty state at a constant temperature of 15° C. for 10 minutes, the temperature was raised up to 215° C. at a temperature raising rate of 10° C./min, and the pans were further kept at a constant temperature at 215° C. for 10 minutes. Secondly, a measurement was conducted according to the same program by using 10 mg of a synthesis sapphire whose constant pressure specific heat is known as a standard substance. Secondly, 10 mg of a measurement sample, which was the same amount as that of the reference sapphire, was cut out of the elastic layer part, set in the sample pan, and a measurement was conducted by the same program. These measurement results were analyzed by using specific thermal analysis software attached to the above-mentioned differential scanning calorimeter, and a constant pressure specific heat ($C_p$) at 25° C. was calculated from the arithmetic average value of the five measurements. The elastic layer had a constant pressure specific heat of 1.15 J/(g·K).

True Density (ρ)

The true density of the elastic layer was measured by a dry automatic densitometer (trade name: Accupyc 1330-01, manufactured by Shimadzu Corporation).

Specifically, using a sample cell of 10 cm³, and a sample was cut out of the elastic layer so as to satisfy 80% of the cell volume, and put into the sample cell. The mass of this sample was measured, the cell was then set on the measurement unit in the apparatus, gas substitution was conducted ten times by using helium as a measurement gas, and after the ten times of gas substitution, volume measurements were conducted ten times. A true density (ρ) was calculated from the mass of the sample and the measured volumes. The elastic layer had a true density of 1.26 g/cm³.

(3-2) Hardness of Elastic Layer

The hardness (°) of the elastic layer was measured by the method explained below. The hardness of the elastic layer was measured by a micro hardness meter. Specifically, a sample piece having a surface area of 8×12 mm and a thickness of 250 µm was prepared and laminated on an elastic layer (an elastic layer after secondary curing) formed on a substrate by the same method as the method used for the measurement of the above-mentioned thermal diffusion rate, whereby a sample piece having a thickness of 2 mm was prepared. Subsequently, five points were measured on one sample by using a Type C microhardness meter (trade name: MD-1 capa Type C, manufactured by Kobunshi Keiki Co., Ltd.). As a result, the average surface microhardness of the elastic layer (sample piece) indicated 30°.

(4) Evaluation of Fixing Belt

A fixing belt obtained by the method described in the above-mentioned (2) was attached as a heating member to a fixing apparatus unit of an electrophotographic image forming apparatus (trade name: imageRunner ADVANCE C5255, manufactured by Canon Inc.).

This fixing apparatus unit was attached to the above-mentioned electrophotographic image forming apparatus. Using this electrophotographic image forming apparatus, A4 size paper (trade name: high white paper GF-0081, basis weight: 81 g/m², manufactured by Canon Inc.) was set so as to be sent in the longitudinal direction (the short side is in parallel to the longitudinal direction of the fixing belt), and images for evaluation were continuously printed on 1,000 sheets. As the images for evaluation, images each formed by using a cyan toner and a magenta toner on the whole surface of the above-mentioned A4 size paper at a concentration of 100% were used. Furthermore, the image for evaluation on the 1,000th sheet was visually observed. Furthermore, at the timepoint when the continuous printing of the images for evaluation on 1,000 sheets had been completed, the fixing belt was visually observed. The observed results were evaluated by the following criteria.

(Evaluation Criteria)

Rank A: No defect due to fixing failure is observed on the image on the 1,000th sheet. Furthermore, for the fixing belt after the continuous printing of the images for evaluation on 1,000 sheets, peeling of the elastic layer from the substrate and breakage of the elastic layer are not observed.

Rank B: A defect due to fixing failure is observed on the image on the 1,000th sheet. Alternatively, for the fixing belt after the continuous printing of the images for evaluation on 1,000 sheets, peeling of the elastic layer from the substrate and breakage of the elastic layer are observed.

Examples 2 to 4

A fixing belt was prepared by a similar method to that in Example 1, except that the amount of the graphite particles a was changed as shown in Table 1. Furthermore, the evaluations of the above-mentioned (3) and (4) were conducted on the obtained fixing belt in a similar manner to that in Example 1. The results are respectively shown in Table 1.

Examples 5 to 11 and Comparative Examples 1 to 3

A fixing belt was prepared by a similar method to that in Example 1, except that the amount and kind of the graphite particles were changed as shown in Table 1. Furthermore, the evaluations of the above-mentioned (3) and (4) were conducted on the obtained fixing belt in a similar manner to that in Example 1. The results are respectively shown in Table 1. However, in Comparative Examples 1 to 3, since the elastic layer was not sufficiently cured due to curing failure, either of thermal conductivity in the thickness direction and the hardness was not measured. Furthermore, any evaluation as a fixing belt was not conducted.

In addition, in Examples 5 to 11 and Comparative Examples 1 to 3, the following graphite particles were respectively used.

Examples 5 and 6: graphite particles b (trade name: P10B-AZ, manufactured by Nippon Carbon Co., Ltd., average particle diameter 11 µm, DBP oil absorption number 51 cm³/100 g).

Example 7: graphite particles c (trade name: SGP-25, manufactured by SEC Carbon, Ltd., average particle diameter: 25 µm, DBP oil absorption number: 79 cm³/100 g).

Example 8: graphite particles d (trade name: SGL-5, manufactured by SEC Carbon, Ltd., average particle diameter: 5 µm, DBP oil absorption number: 78 cm³/100 g).

Example 9: graphite particles e (trade name: SGL-60, manufactured by SEC Carbon, Ltd., average particle diameter: 60 μm, DBP oil absorption number: 49 cm$^3$/100 g).

Example 10: graphite particles f (trade name: AT-No. 40, manufactured by Oriental Industry Co., Ltd., average particle diameter: 3 μm, DBP oil absorption number: 75 cm$^3$/100 g).

Example 11: graphite particles g (trade name: AT-No. 5, manufactured by Oriental Industry Co., Ltd., average particle diameter: 30 μm, DBP oil absorption number: 56 cm$^3$/100 g).

Comparative Examples 1 to 3: graphite particles h (trade name: UF-G30, manufactured by Showa Denko K. K., average particle diameter: 10 μm, DBP oil absorption number: 87 cm$^3$/100 g).

Examples 12 to 15 and Comparative Examples 4 to 7

As shown in Table 1, using a silicone polymer having an unsaturated aliphatic group (Vi), a silicone polymer having active hydrogen groups (SiH) and graphite particles, a fixing belt was prepared by a similar method to that in Example 1. Furthermore, the evaluations of the above-mentioned (3) and (4) were conducted on the obtained fixing belt in a similar manner to that in Example 1. The results are respectively shown in Table 1. However, in Comparative Examples 4 to 7, since the elastic layer was not sufficiently cured due to curing failure, either of thermal conductivity in the thickness direction and the hardness was not measured. Furthermore, any evaluation as a fixing belt was not conducted.

The weight average molecular weights and the like of the silicone polymers in Table 1 are as follows.

Vi-2: a silicone polymer having vinyl groups on the both terminals represented by Structural Formula 5 (weight average molecular weight: 62,700, kinematic viscosity: 10,000 mm$^2$/sec, the amount of the vinyl group was introduced at a silicon atom ratio in Vi-2 of by 0.2 mol %).

SiH-2: a silicone polymer having the active hydrogen group bound to the silicon atoms represented by Structural Formula 6 (R$_7$ represents a methyl group) (weight average molecular weight: 2,000, kinematic viscosity: 30 mm$^2$/sec, the amount of the active hydrogen group bound to the silicon atoms was such that 16.5 mol % was introduced at a silicon atom ratio in SiH-2).

In Examples 12 to 15 and Comparative Examples 4 to 7, the following graphite particles were respectively used.

Examples 12 to 15: graphite particles a (trade name: SGL-12, manufactured by SEC Carbon, Ltd., average particle diameter: 12 μm, DBP oil absorption number: 70 cm$^3$/100 g).

Comparative Examples 4 to 7: graphite particles h (trade name: UF-G30, manufactured by Showa Denko K. K., average particle diameter: 10 μm, DBP oil absorption number: 87 cm$^3$/100 g).

Reference Examples 1 to 3

A fixing belt was prepared by a similar method to that in Example 1, except that the graphite particles used in Example 1 were changed to carbon black. Furthermore, the evaluations of the above-mentioned (3) and (4) were conducted on the obtained fixing belt in a similar manner to that in Example 1. The results are respectively shown in Table 1. However, in Reference Example 1, since the elastic layer was not sufficiently cured due to curing failure, either of thermal conductivity in the thickness direction and the hardness was not measured. Furthermore, any evaluation as a fixing belt was not conducted. On the other hand, the fixing belts in Reference Examples 2 and 3 were evaluated as Rank "B" as fixing belts. This is because a defect due to fixing failure was observed on the image for evaluation on the 1,000$^{th}$ sheet. It is considered that this fixing failure is due to that the thermal conductivities in the thickness directions of the fixing belts of Reference Examples 2 and 3 were not sufficient.

In these Reference Examples, the following carbon blacks were used.

Reference Example 1: carbon black i (trade name: Toka Black #8500, manufactured by Tokai carbon Co., Ltd., average particle diameter: 0.014 μm, DBP oil absorption number: 96 cm$^3$/100 g).

Reference Example 2: carbon black j (trade name: Toka Black #7050, manufactured by Tokai carbon Co., Ltd., average particle diameter: 0.066 μm, DBP oil absorption number: 66 cm$^3$/100 g).

Reference Example 3: carbon black k (trade name: Asahi Carbon Black #15, manufactured by Asahi Carbon Co., Ltd., average particle diameter: 0.122 μm, DBP oil absorption number: 41 cm$^3$/100 g).

TABLE 1

| | Addition-curable Liquid Silicone Rubber | | | | Graphite Particles or Carbon Black | | | Elastic Layer | | |
| | Vi | | SiH | | | | | Thermal Conductivity | | |
| | Kind | Filler Content (parts by mass) | Kind | Filler Content (parts by mass) | Kind | DBP Oil absorption number (cm$^3$/100 g) | Average Particle Diameter (μm) | Filler Content (% by mass) | in Thickness Direction (W/(m·K)) | Hardness (°) | Fixing Belt Evaluation |
|---|---|---|---|---|---|---|---|---|---|---|---|
| Example 1 | Vi-1 | 100 | SiH-1 | 2.5 | a | 70 | 12 | 43 | 0.84 | 30 | A |
| Example 2 | | | | | | | | 49 | 1.09 | 31 | A |
| Example 3 | | | | | | | | 59 | 1.50 | 30 | A |
| Example 4 | | | | | | | | 66 | 1.81 | 34 | A |
| Example 5 | | | | | b | 51 | 11 | 24 | 0.53 | 18 | A |
| Example 6 | | | | | | | | 43 | 0.84 | 28 | A |
| Example 7 | | | | | c | 79 | 25 | 43 | 0.85 | 28 | A |
| Example 8 | | | | | d | 78 | 5 | 43 | 1.05 | 32 | A |
| Example 9 | | | | | e | 49 | 60 | 43 | 0.72 | 32 | A |
| Example 10 | | | | | f | 75 | 3 | 43 | 0.99 | 35 | A |
| Example 11 | | | | | g | 56 | 30 | 43 | 0.82 | 31 | A |

TABLE 1-continued

| | Addition-curable Liquid Silicone Rubber | | | | Graphite Particles or Carbon Black | | | Elastic Layer | | |
| | Vi | | SiH | | | | | Thermal Conductivity | | |
| | Kind | Filler Content (parts by mass) | Kind | Filler Content (parts by mass) | Kind | DBP Oil absorption number (cm³/100 g) | Average Particle Diameter (μm) | Filler Content (% by mass) | in Thickness Direction (W/(m · K)) | Hardness (°) | Fixing Belt Evaluation |
|---|---|---|---|---|---|---|---|---|---|---|---|
| Comparative Example 1 | | | | | h | 87 | 10 | 33 | — | — | — |
| Comparative Example 2 | | | | | | | | 43 | — | — | — |
| Comparative Example 3 | | | | | | | | 49 | — | — | — |
| Example 12 | Vi-1 | 100 | SiH-1 | 2.0 | a | 70 | 12 | 43 | 0.84 | 22 | A |
| Example 13 | | | | 3.0 | | | | 43 | 0.85 | 45 | A |
| Comparative Example 4 | | | | 2.0 | h | 87 | 10 | 43 | — | — | — |
| Comparative Example 5 | | | | 3.0 | | | | 43 | — | — | — |
| Example 14 | Vi-1 | 100 | SiH-2 | 3.5 | a | 70 | 12 | 43 | 0.85 | 39 | A |
| Comparative Example 6 | | | | | h | 87 | 10 | 43 | — | — | — |
| Example 15 | Vi-2 | 100 | SiH-1 | 3.0 | a | 70 | 12 | 43 | 0.85 | 22 | A |
| Comparative Example 7 | | | | | h | 87 | 10 | 43 | — | — | — |
| Reference Example 1 | Vi-1 | 100 | SiH-1 | 2.5 | i | 96 | 0.014 | 43 | — | — | — |
| Reference Example 2 | | | | | j | 66 | 0.066 | 43 | 0.20 | 32 | B |
| Reference Example 3 | | | | | k | 41 | 0.122 | 43 | 0.18 | 34 | B |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-014476, filed Jan. 30, 2017, which is hereby incorporated by reference herein in its entirety.

What is claimed is:

1. An electrophotographic member comprising:
a substrate; and
an elastic layer on the substrate,
the elastic layer containing a cured product of an addition-curable liquid silicone rubber mixture including:
an addition-curable liquid silicone rubber, and
graphite particles, and
the graphite particles having a DBP oil absorption number of 40 cm³/100 g or more and lower than 80 cm³/100 g.

2. The electrophotographic member according to claim 1, wherein the cured product contains the graphite particles at a content ratio of 20% by mass or more and lower than 70% by mass on the basis of the cured product.

3. The electrophotographic member according to claim 1, wherein the graphite particles have an average particle diameter of 3 μm or more and 30 μm or less.

4. The electrophotographic member according to claim 1, wherein the elastic layer has a thermal conductivity (λ) in the thickness direction of 1.1 W/(m·K) or more and 5.0 W/(m·K) or less.

5. The electrophotographic member according to claim 1, wherein
the electrophotographic member is an electrophotographic belt having an endless belt shape,
the substrate has an endless belt shape, and
the elastic layer is positioned on the outer peripheral surface of the substrate having the endless belt shape.

6. The electrophotographic member according to claim 5, wherein the elastic layer further has a surface layer on the outer peripheral surface.

7. A method for producing an electrophotographic member, comprising:
applying an addition-curable liquid silicone rubber mixture on an outer surface of a substrate; and
forming an elastic layer by curing the addition-curable liquid silicone rubber mixture,
wherein the addition-curable liquid silicone rubber mixture includes: an addition-curable liquid silicone rubber, and graphite particles,
wherein the graphite particles have a DBP oil absorption number of 40 cm³/100 g or more and lower than 80 cm³/100 g.

8. A fixing apparatus comprising a heating member and a pressurizing member disposed opposing to the heating member, wherein
the heating member comprises a substrate and an elastic layer on the substrate,
the elastic layer contains a cured product of an addition-curable liquid silicone rubber mixture containing an addition-curable liquid silicone rubber and graphite particles, and
the graphite particles have a DBP oil absorption number of 40 cm³/100 g or more and lower than 80 cm³/100 g.

9. The fixing apparatus according to claim 8, wherein
the heating member is an electrophotographic belt having an endless belt shape,
the substrate has an endless belt shape,
the elastic layer is positioned on the outer peripheral surface of the substrate having the endless belt shape, and a heater is disposed in contact with the inner peripheral surface of the substrate.

\* \* \* \* \*